United States Patent
Entenmann et al.

(10) Patent No.: US 9,878,731 B2
(45) Date of Patent: Jan. 30, 2018

(54) STEERING WHEEL WITH DATA TRANSMISSION VIA A FINGER NAVIGATION MODULE

(71) Applicant: Daimler AG, Stuttgart (DE)

(72) Inventors: Volker Entenmann, Affalterbach (DE); Volker Gerhardt, Schoenaich (DE); Joerg Reisinger, Loechgau (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/764,941

(22) PCT Filed: Jan. 18, 2014

(86) PCT No.: PCT/EP2014/000130
§ 371 (c)(1),
(2) Date: Jul. 30, 2015

(87) PCT Pub. No.: WO2014/117917
PCT Pub. Date: Aug. 7, 2014

(65) Prior Publication Data
US 2015/0360711 A1  Dec. 17, 2015

(30) Foreign Application Priority Data

Jan. 31, 2013 (DE) .................. 10 2013 001 777

(51) Int. Cl.
*B62D 1/04* (2006.01)
*B60K 37/06* (2006.01)
*G06F 3/03* (2006.01)

(52) U.S. Cl.
CPC .............. *B62D 1/046* (2013.01); *B60K 37/06* (2013.01); *G06F 3/0304* (2013.01); *B60K 2350/1024* (2013.01); *B60K 2350/928* (2013.01)

(58) Field of Classification Search
CPC ...... B60K 2350/1024; B60K 2350/928; B60K 37/06; B62D 1/046; G06F 3/0304
See application file for complete search history.

(56) References Cited

U.S. PATENT DOCUMENTS 4,792,783 A * 12/1988 Burgess ................. B60K 35/00
307/10.1
5,821,935 A * 10/1998 Hartman ................ B60K 37/06
307/10.1
(Continued)

FOREIGN PATENT DOCUMENTS

| CN | 1605501 A | 4/2005 |
|----|-----------|--------|
| CN | 201712656 U | 1/2011 |

(Continued)

OTHER PUBLICATIONS

PCT/EP2014/000130, International Search Report (PCT/ISA/220 and PCT/ISA/210) dated Jul. 9, 2014, with partial English translation, enclosing Written Opinion of the International Searching Authority (PCT/ISA/237) (Nineteen (19) pages).

(Continued)

*Primary Examiner* — Kenneth Bukowski
(74) *Attorney, Agent, or Firm* — Crowell & Moring LLP

(57) ABSTRACT

A steering wheel for a motor vehicle is disclosed. The steering wheel includes an optical finger navigation module, at least one further operating element, a steering wheel electronic system and a databus for data transmission between the optical finger navigation module and the steering wheel electronic system. The at least one further operating element is directly connected to the optical finger navigation module via a signal line. The optical finger navigation module is designed in such a way as to receive a signal from the at least one further operating element and relay it on to the steering wheel electronic system via the databus. In this way, no dedicated lines from the operating (Continued)

element to the steering wheel electronic system are necessary. Thus, the construction space for the installation of a device consisting of an optical finger navigation module and a further operating element in a steering wheel is reduced.

7 Claims, 4 Drawing Sheets

(56) References Cited

U.S. PATENT DOCUMENTS

| | | | | |
|---|---|---|---|---|
| 6,373,472 | B1* | 4/2002 | Palalau | B60K 37/02 |
| | | | | 345/156 |
| 7,026,561 | B2* | 4/2006 | Min | B60Q 1/1484 |
| | | | | 200/61.54 |
| 8,843,268 | B2* | 9/2014 | Lathrop | B60K 35/00 |
| | | | | 340/438 |
| 2003/0023353 | A1 | 1/2003 | Badarneh | |
| 2009/0164062 | A1* | 6/2009 | Aoki | B60Q 1/0082 |
| | | | | 701/36 |
| 2011/0030502 | A1 | 2/2011 | Lathrop | |
| 2013/0048857 | A1 | 2/2013 | Hasselbrinck et al. | |
| 2015/0002404 | A1* | 1/2015 | Hooton | B62D 1/046 |
| | | | | 345/173 |

FOREIGN PATENT DOCUMENTS

| | | |
|---|---|---|
| CN | 202389433 U | 8/2012 |
| DE | 10 2006 024 252 A1 | 1/2008 |
| DE | 10 2009 030 592 A1 | 12/2010 |
| DE | 10 2010 026 291 A1 | 2/2011 |
| DE | 10 2011 018 234 A1 | 2/2012 |
| DE | 10 2010 053 788 A1 | 6/2012 |
| EP | 1 762 421 A1 | 3/2007 |
| WO | WO 97/13657 A1 | 4/1997 |

OTHER PUBLICATIONS

German Office Action dated Oct. 7, 2013 (Six (6) pages).
Chinese Office Action issued in Chinese counterpart application No. 201480006711.8 dated Nov. 17, 2016, with partial English translation (Nine (9) pages).

* cited by examiner

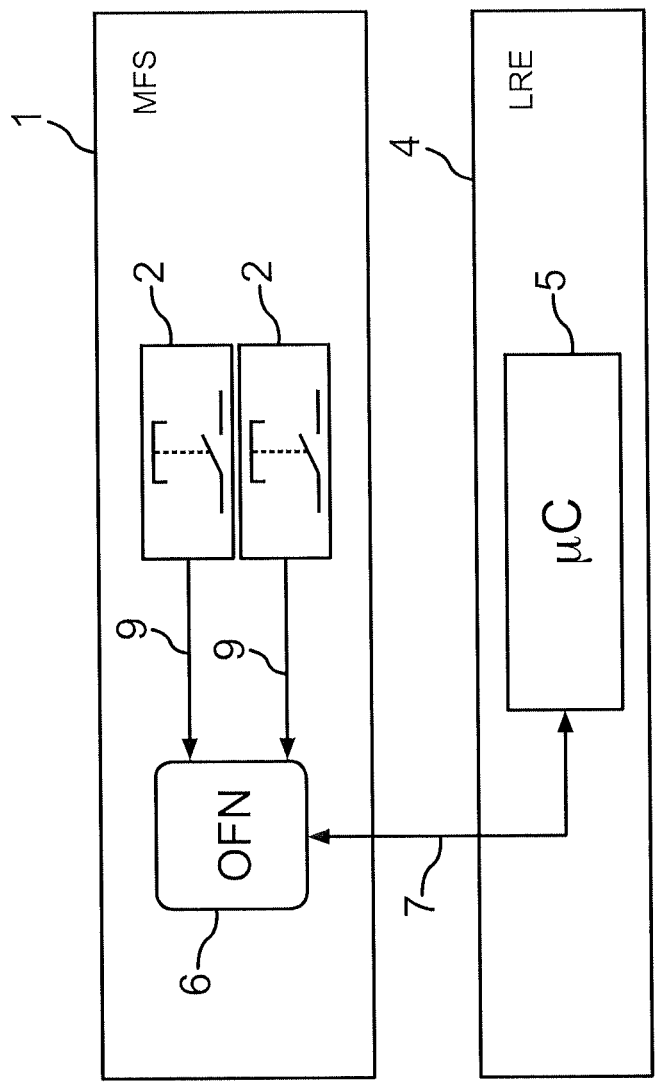

STEERING WHEEL WITH DATA TRANSMISSION VIA A FINGER NAVIGATION MODULE

BACKGROUND AND SUMMARY OF THE INVENTION

The present invention concerns a steering wheel for a motor vehicle having an optical finger navigation module, at least one further operating element, a steering wheel electronic system and a databus for data transmission between the optical finger navigation module and the steering wheel electronic system.

An optical finger navigation module (OFN) can be integrated as a sensor for the detection of finger movements in the left and/or right switch block of a motor vehicle steering wheel. A display menu can be controlled with the signals of this kind of switch block. Each, or at least one, switch block like this can additionally contain at least one further operating element, in particular a push button, for direct access to particular functions. For the most part, a switch block has several operating elements.

The sensor data of each optical finger navigation module and the activation states of each of the several operating elements would have to be transmitted by the respective switch block for further processing. In particular, the sensor data must be conveyed to the steering wheel electronic system and then to the HMI (Human Machine Interface) components, for example an instrument cluster or main unit (HU).

If the switch block 1 (MFS; multi-function switch) of a steering wheel of a motor vehicle has several push buttons 2, for example according to FIG. 1, then the signals from these push buttons 2 are to be transmitted via corresponding signal lines 3 to a steering wheel electronic system (LRE). As a rule, the LRE is equipped with a controller 5, which carries out the communication with the operating elements 2 via the signal lines 3. The switch or activation states of the operating elements 2 of the switch block 1 are therefore imported directly by the controller 5 in the steering wheel electronic system 4. For this, signal lines 3 depending on the number of operating elements 2 will be needed by each of the switch blocks 1 of a steering wheel to the steering wheel electronic system 4. The number of possible signal lines 3 is thereby limited by the size of the connector and the available building space inside the steering wheel.

As previously mentioned, a switch block of a steering wheel can also contain an optical finger navigation module 6 as a sensor for the detection of finger movements, as is sketched in FIG. 2. In addition to the structure in FIG. 1, then, an additional databus connection 7 is needed with the integration of the OFN 6 in the switch block 1 between the controller in the OFN 6 and the controller 5 in the steering wheel electronic system 4. There is usually not enough construction space for this additional databus line, or the additional databus lines and the corresponding plugs. In addition, the costs for this kind of steering wheel increase with the number of lines.

The object of the present invention therefore consists in reducing the construction space needed for the installation of an optical finger navigation module and at least one further operating element in a steering wheel.

According to the invention, then, a steering wheel for a motor vehicle is provided having an optical finger navigation module,
at least one further operating element,
a steering wheel electronic system and
a databus for data transmission between the optical finger navigation module and the steering wheel electronic system, wherein the at least one further operating element is directly connected to the optical finger navigation module via a signal line, and
the optical finger navigation module is designed in such a way as to receive a signal from the at least one further operating element and relay it on to the steering wheel electronic system via the databus.

The at least one further operating element is therefore connected directly via a signal line to the optical finger navigation module, which as a rule is located near to the operating element for ergonomic reasons. In order to transmit the signal from the operating element to the steering wheel electronic system, the databus connection already in place between the optical finger navigation module and the steering wheel electronic system can then be used. Consequently, a separate data line from the operating element to the remotely-located steering wheel electronic system can be avoided.

The optical finger navigation module and the steering wheel electronic system each preferably have a controller, and the two controllers communicate with each other via the databus. Communication by means of the controller has the advantage that a physically simply-formed databus can be used.

The signal from the at least one further operating element can represent the state thereof. In particular, the signal can be a binary signal, which relays the pressed or not-pressed state of a button.

Furthermore, the OFN can be designed to process the signals from the at least one further operating element and to relay the processed signals to the steering wheel electronic system. In this way it is possible that a decentralized pre-processing of the signals from the operating element or elements is carried out in the OFN.

The steering wheel electronic system can furthermore be designed in such a way as to engage a power saving mode or active mode, and to change from the power saving mode to the active mode upon receiving a predetermined activation signal from the OFN. In this way it is possible for the whole steering wheel electronic system to remain in a power saving mode until it is actually used. As a rule, the actual use of the steering wheel electronic system is limited to a small fraction of the actual motor vehicle operation.

The activation signal for the steering wheel electronic system can be generated by activating the at least one further operating element. Therefore, using one and the same operating element not only is an instrument cluster operated, for example, but also with it an activation signal (e.g. a wake-up-signal) for the steering wheel electronic system is generated.

Corresponding to a further embodiment, the processing of the signals from the at least one further operating element can include the debouncing thereof. In this way, activation of the operating element can be reliably identified in a short period of time.

Moreover, the OFN and the at least one further operating element can be integrated in a single housing. This kind of housing represents, for example, the housing of a switch block, which can then be mounted as a whole unit in a steering wheel at low cost.

Overall, it is advantageous if a motor vehicle is equipped with the steering wheel described above and hence can profit from the present invention.

The present invention is described in greater detail by means of the attached drawings.

BRIEF DESCRIPTION OF THE DRAWINGS

FIG. 4 is a schematic circuit diagram for transmission according to the invention of operating element signals via a databus of an optical finger navigation module.

DETAILED DESCRIPTION OF THE DRAWINGS

The exemplary embodiments described in more detail below represent preferred embodiments of the invention.

Figure 1:
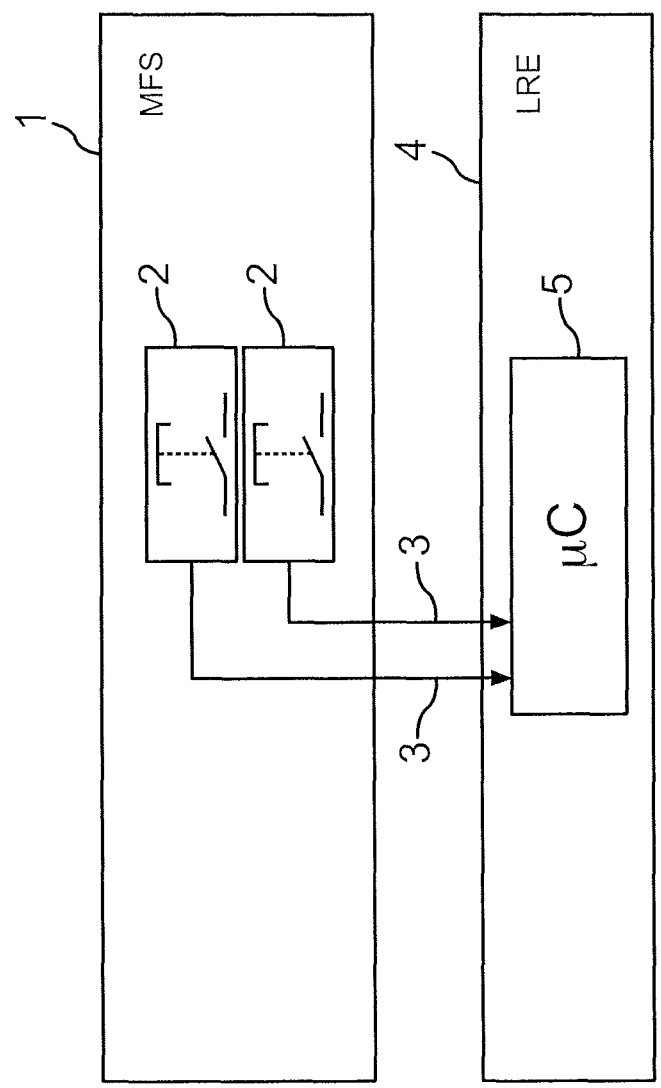
FIG. 1 illustrates a circuit diagram for direct importing of operating elements by the steering wheel electronic system according to the prior art.
Figure 2:
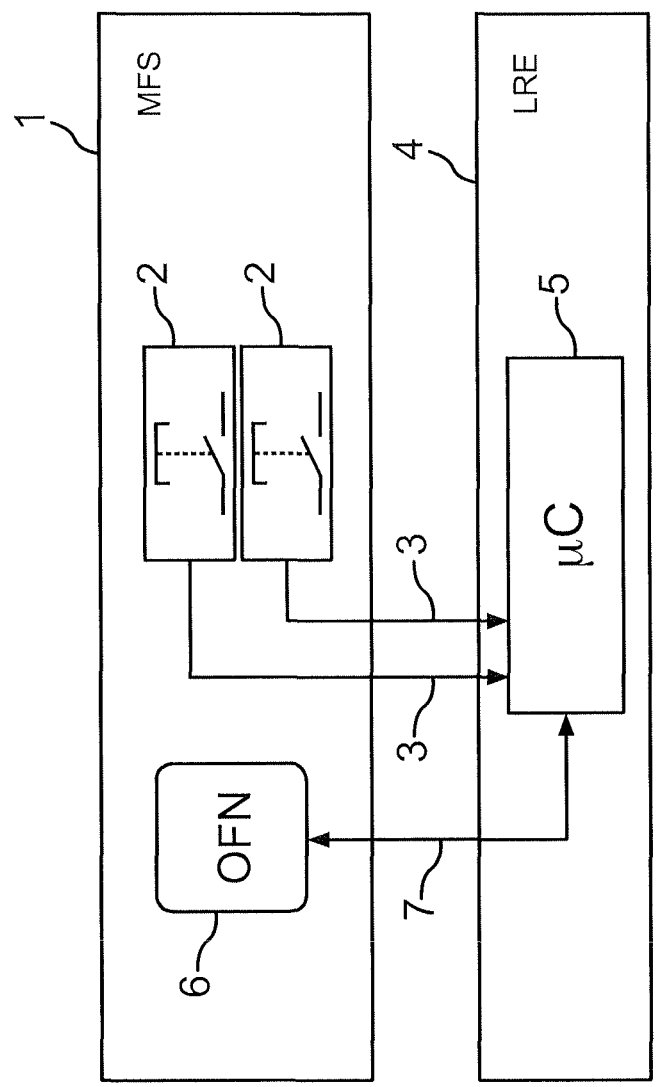
FIG. 2 is a schematic circuit diagram for parallel transmission of operating element signals and data of an optical finger navigation module.
Figure 3:
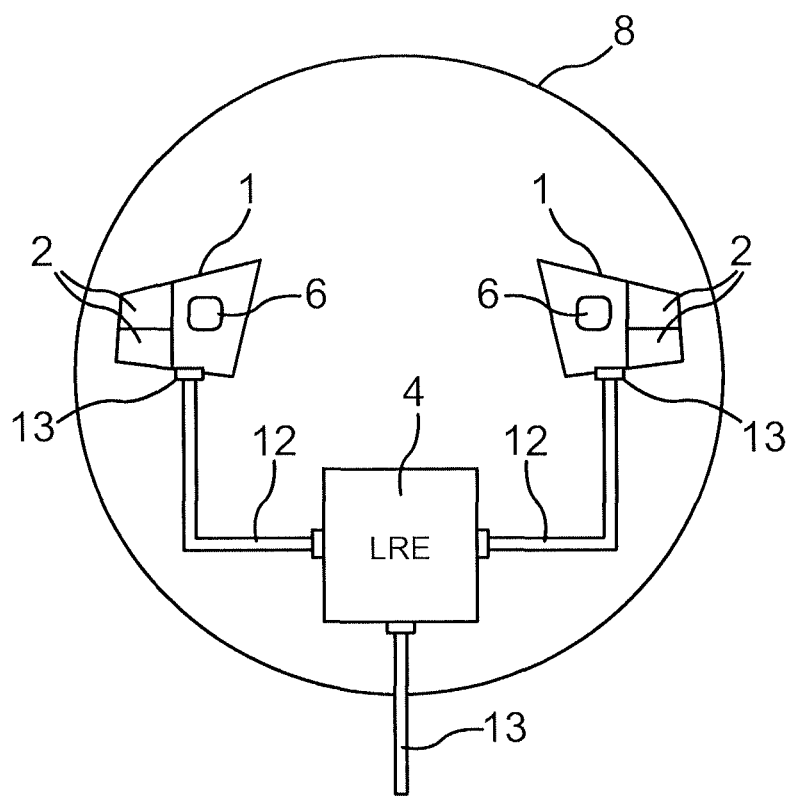
FIG. 3 is a sketch of a steering wheel having optical finger navigation modules.

A steering wheel 8 is schematically represented in FIG. 3. There are two switch blocks 1 located here on the steering wheel 8 in ergonomically suitable positions, which can also be labelled as multi-functional switches (MFS). Each of these switch blocks 1 can then preferably be easily reached with the respective thumb, if the driver has his or her hands on the steering wheel in a typical manner whilst driving. In other exemplary embodiments only one such switch block is provided, or more than two switch blocks or multi-functional switches are provided.

In the example of FIG. 3, each switch block 1 has an optical finger navigation module 6 (OFN). Furthermore, the switch blocks 1 each have several mechanical operating elements 2. In the present case, each switch block 1 features two operating elements 2 next to the OFN 6. There can also, however, be just a single operating element 2 present next to the OFN 6 in a switch block 1. Likewise, there can also be more than two operating elements present in the respective switch block 1.

Push buttons are particularly suitable as operating elements. Furthermore, push switches, rocker switches, rollers or similar can also be available as operating elements in each of the switch blocks.

A cable 12, which is equipped with plugs 13 at its ends, facilitates the transmission of data from the left switch block 1 to a steering wheel electronic system 4 (LRE). Analogously to this, communication from the right switch block 1 to the steering wheel electronic system 4 is carried out via a further cable 12. The signal output from the steering wheel electronic system 4 to, for example, a jacket pipe switch module (not shown in FIG. 3) is carried out via an additional cable 13.

As has already been mentioned, each OFN 6 serves as a sensor for the detection of finger movements. The cables 12 serve to implement a databus connection between the OFN modules 6 and the steering wheel electronic system 4. Additionally, the signals from the operating elements or element 2 must each be transmitted from switch block 1 to steering wheel electronic system 4 via the cables 12. The cables 12 including their plugs 13 should be designed to be as small as possible, in order to save construction space.

The signal transmission from the OFN 6 to the LRE 4 and that of the operating elements 2 to the LRE 4 are shown in detail in FIG. 4. The operating elements 2 of the switch block 1 are implemented here as push buttons. However they can, as has already been indicated, also be push switches, rocker switches, rollers or similar, with which a function can be directly controlled. The number of operating elements in the switch block 1 can likewise vary. The number can therefore amount to 1, 2, 3, 4 etc. The signal from each operating element 2 is led via a separate signal line 9 to the OFN 6 in each case. The OFN 6 has an interface for receiving signals from the operating elements 2 via the signal line 9.

The data or signals from the operating elements 2 of the switch block 1 can therefore be imported by a controller (not shown in FIG. 4) contained in the OFN 6. The data or signals from the operating elements 2 are then transmitted together with those from the OFN via a databus line 7 to the controller 5 of a steering wheel electronic system 4. A databus connection therefore exists between the OFN controller and the controller 5 of the steering wheel electronic system 4. When being used, the states (e.g. switch positions) of the operating elements 2 are then transmitted together with the sensor data from the OFN 6 via the same databus 7, so that some signal lines can be omitted from the operating elements 2.

Additionally, the OFN 6 can also take on a pre-processing of the operating element signals from the signal lines 9. For example, the signals from the switches or buttons (operating elements 2) can be debounced. This debouncing can be carried out in the OFN 6, for example using hardware. Here a low-pass filter is used, for example, which suppresses high-frequency signal portions that arise from chatter. Alternatively, a toggle switch can be provided for debouncing. Alongside this, the debouncing can also be implemented using software, wherein a change of state of the contact is only registered if it is available for a specified period of time. Due to the debouncing of the signals of the operating elements, the cycle time for the data transmission to the databus can be chosen to be larger than the scanning time of the signals in the single lines 9.

Furthermore, using corresponding circuitry, additional functions can be implemented via the databus 7. So for example, if the steering wheel electronic system is in power saving mode, a so-called "wake up" of the steering wheel electronic system 4 can be initiated by activating one of the operating elements 2. In this way the steering wheel electronic system 4 changes from power saving mode to active mode. For this, the OFN 6 only has to continuously scan a single signal line 9 of an operating element 2 in the switch block 1.

Put more precisely, the steering wheel electronic system 4 provides the OFN 6 with energy if it is switched on, i.e. if it is in active mode. When there is available supply voltage for the OFN 6, all lines of the databus connection allocated to the OFN 6 and used for the transmission of databus signals are used, due to external circuitry of respective lines of the databus connection or databus line 7, for example having several transistors.

If the steering wheel electronic system 4 is switched off, i.e. in power saving mode, then the steering wheel electronic system 4 does not supply the OFN 6 with energy. In this case, due to the external circuitry, one of the lines of the databus connection is separated from the OFN 6 and allocated directly to the operating element 2 or the operating elements 2, due to the activation of which the steering wheel 4 can be woken up. In this way, a line of the databus connection is therefore used as a wake-up line, if the OFN 6 is not supplied with energy, using which a waking up of the steering wheel electronic system 4 can be carried out without an active OFN 6 and hence without closed current.

Furthermore, in the OFN 6 a pre-processing can also be carried out to the effect that the signals of several operating elements are linked by a logic. Likewise, in this way it is possible that the signals of the operating elements 2 are transmitted unprocessed or pre-processed via the databus 7 from the OFN to the LRE 4.

Due to the present invention, the number of lines, on the one side, between the switch block or blocks with OFN and, on the other side, the steering wheel electronic system are minimized. Only in this way can the integration of the OFN in the switch blocks be represented in term of construction space. Additionally, the number of operating elements in the switch block can be varied within specific limits, without this having repercussions on the cable set between switch block and steering wheel electronic system.

The invention claimed is:

1. A steering wheel for a motor vehicle, comprising:
two switch blocks, wherein each of the two switch blocks are easily reachable with a respective finger of an operator of the steering wheel and wherein each of the two switch blocks include:
an optical finger navigation module containing a controller, wherein the optical finger navigation module is a sensor that detects a movement of the respective finger of the operator of the steering wheel as sensor data; and
an operating element, wherein the operating element operates a function of the motor vehicle;
wherein the optical finger navigation module and the operating element are integrated in a single housing;
a steering wheel electronic system; and
two databusses, wherein data is transmittable between a one of the respective optical finger navigation modules and the steering wheel electronic system by a respective one of the two databusses;
wherein the respective operating elements are directly connected to the respective optical finger navigation modules via a respective signal line and wherein the respective operating elements are not directly connected to the steering wheel electronic system via a signal line;
and wherein a signal representing a state of the respective operating element is only received by the respective optical finger navigation module from the respective operating element via the respective signal line and is transmitted together with the sensor data of the respective optical finger navigation module to the steering wheel electronic system via the respective databus.

2. The steering wheel according to claim 1, wherein the steering wheel electronic system has a controller and wherein the respective controllers of the optical finger navigation modules and the controller of the steering wheel electronic system communicate with each other via the respective databusses.

3. The steering wheel according to claim 1, wherein the respective signal received by the respective optical finger navigation module is processable by the respective optical finger navigation module and wherein a respective processed signal is transmitted together with the respective sensor data of the respective optical finger navigation module to the steering wheel electronic system via the respective databus.

4. The steering wheel according to claim 3, wherein a processing of the respective signal includes a debouncing of the signal.

5. The steering wheel according to claim 1, wherein the steering wheel electronic system has a power saving mode and an active mode and wherein, upon receiving a predetermined activation signal from at least one of the optical finger navigation modules, the steering wheel electronic system switches from the power saving mode to the active mode.

6. The steering wheel according to claim 5, wherein the predetermined activation signal is generated by activating the respective operating element.

7. A motor vehicle having a steering wheel according to claim 1.

* * * * *